US012183139B2

(12) United States Patent
Neill et al.

(10) Patent No.: US 12,183,139 B2
(45) Date of Patent: Dec. 31, 2024

(54) FACIAL RECOGNITION FRICTIONLESS ACCESS CONTROL

(71) Applicant: Tyco Fire & Security GmbH, Neuhausen am Rheinfall (CH)

(72) Inventors: Terence Neill, Lisburn (GB); Anne Gallagher, Boca Raton, FL (US); Derek J. Boyes, Craigavon (GB); Peter Lawrence, Lisburn (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/447,079

(22) Filed: Aug. 9, 2023

(65) Prior Publication Data

US 2023/0386280 A1     Nov. 30, 2023

Related U.S. Application Data

(62) Division of application No. 17/057,476, filed as application No. PCT/US2019/033111 on May 20, 2019, now Pat. No. 11,749,038.

(60) Provisional application No. 62/674,476, filed on May 21, 2018.

(51) Int. Cl.
| | |
|---|---|
| G07C 9/00 | (2020.01) |
| G06F 16/53 | (2019.01) |
| G06V 40/16 | (2022.01) |
| G06V 40/20 | (2022.01) |
| G08B 7/06 | (2006.01) |

(52) U.S. Cl.
CPC ......... *G07C 9/00563* (2013.01); *G06F 16/53* (2019.01); *G06V 40/168* (2022.01); *G06V 40/172* (2022.01); *G06V 40/20* (2022.01); *G08B 7/06* (2013.01)

(58) Field of Classification Search
CPC .. G07C 9/00563; G06F 16/53; G06V 40/168; G06V 40/172; G06V 40/20; G08B 7/06
USPC ........................................................ 340/5.53
See application file for complete search history.

(56) References Cited

U.S. PATENT DOCUMENTS

| | | | | |
|---|---|---|---|---|
| 9,269,208 | B2 * | 2/2016 | Burke | G06F 21/6218 |
| 9,344,436 | B1 * | 5/2016 | Sheng | H04W 12/08 |
| 9,824,248 | B2 * | 11/2017 | Sheng | H04W 4/026 |
| 9,875,592 | B1 * | 1/2018 | Erickson | G07C 9/00563 |
| 9,942,222 | B1 * | 4/2018 | Fenton | H04L 63/0853 |

(Continued)

FOREIGN PATENT DOCUMENTS

CN          103514440 A      1/2014

OTHER PUBLICATIONS

International Search Report and Written Opinion in PCT/US2019/033111, mailed Oct. 24, 2019, 17 pages.

*Primary Examiner* — Zhen Y Wu (74) *Attorney, Agent, or Firm* — ArentFox Schiff LLP (57) ABSTRACT

An access control system can include a camera that detects an image regarding a subject, a database maintaining information, a facial recognizer that receives the image and identifies a facial feature of the subject based on the received image and the facial information maintained by the database, and a processor to alert security or another user when an authorized user accessing an area of a building is under duress, when an unauthorized user is accessing an area of a building by tailgating after an authorized user, when an authorized user has not provided two-factor authentication, or when an authorized user is in a particular area of the building.

17 Claims, 6 Drawing Sheets

(56) References Cited

U.S. PATENT DOCUMENTS

| | | | |
|---|---|---|---|
| 10,255,733 B2 | 4/2019 | Zavesky et al. | |
| 10,482,698 B2* | 11/2019 | Caterino | H04W 12/06 |
| 10,496,874 B2* | 12/2019 | Tamura | G06V 40/167 |
| 10,535,208 B2 | 1/2020 | Zavesky et al. | |
| 10,679,443 B2 | 6/2020 | Grigorov et al. | |
| 10,783,727 B2 | 9/2020 | Zavesky et al. | |
| 10,796,514 B2 | 10/2020 | Madzhunkov et al. | |
| 11,133,929 B1* | 9/2021 | Shahidzadeh | H04L 9/0891 |
| 2002/0067259 A1* | 6/2002 | Fufidio | G07C 9/28 |
| | | | 340/541 |
| 2006/0072793 A1* | 4/2006 | Determan | G06V 40/18 |
| | | | 382/117 |
| 2008/0068183 A1* | 3/2008 | Diamant | G06F 21/31 |
| | | | 340/539.18 |
| 2012/0169872 A1* | 7/2012 | Williamson | G08B 13/19615 |
| | | | 348/143 |
| 2014/0337634 A1* | 11/2014 | Starner | H04W 12/33 |
| | | | 713/186 |
| 2015/0102907 A1* | 4/2015 | Hadizad | G07C 9/20 |
| | | | 340/5.64 |
| 2015/0140964 A1* | 5/2015 | Horton | H04L 63/107 |
| | | | 455/410 |
| 2015/0221151 A1* | 8/2015 | Bacco | H04L 9/3231 |
| | | | 340/5.83 |
| 2015/0269582 A1* | 9/2015 | Simmons | G06Q 20/42 |
| | | | 705/44 |
| 2015/0339870 A1* | 11/2015 | Cojocaru | G07C 9/00563 |
| | | | 340/5.53 |
| 2016/0267760 A1* | 9/2016 | Trani | G07C 9/28 |
| 2017/0124362 A1* | 5/2017 | Sheng | G06K 7/10396 |
| 2017/0316258 A1* | 11/2017 | Hoy | G06V 20/52 |
| 2018/0107880 A1* | 4/2018 | Danielsson | G08B 13/194 |
| 2018/0122219 A1* | 5/2018 | Caterino | H04L 9/3226 |
| 2019/0057561 A1* | 2/2019 | Zavesky | A61B 5/4833 |
| 2019/0065714 A1 | 2/2019 | Adams | |
| 2019/0174102 A1* | 6/2019 | Cui | G08B 13/19613 |
| 2019/0236867 A1 | 8/2019 | Zavesky et al. | |
| 2020/0126337 A1* | 4/2020 | Friedli | B66B 1/468 |
| 2020/0151985 A1 | 5/2020 | Zavesky et al. | |

* cited by examiner

FACIAL RECOGNITION FRICTIONLESS ACCESS CONTROL

CROSS-REFERENCE TO RELATED APPLICATION(S)

This application is a Divisional application of Ser. No. 17/057,476, filed Nov. 20, 2020, which claims priority to U.S.C. § 371 National Phase Application of PCT Application No. PCT/US2019/033111 filed May 20, 2019, which claims priority to U.S. Provisional Application Ser. No. 62/674,476, entitled "FACIAL RECOGNITION FRICTIONLESS ACCESS CONTROL" and filed on May 21, 2018, which are expressly incorporated by reference herein in its entirety.

BACKGROUND

Access control systems can be used to selectively enable users to pass through specific locations in a building or other facility. Access control systems may include card readers, cameras, or other systems that receive input information and determine whether to provide access by opening doors, gates, or other impediments. While typical access control systems provide a level of automation and security to buildings, additional security or verification is needed in some situations. Accordingly, improvements in access control systems are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an implementation of the present disclosure, an access control system can include a camera configured to detect an image regarding a subject. The access control system can also include a database configured to maintain facial information and skeletal information regarding a plurality of subjects. The access control system can include a processor in communication with the camera and the database, wherein the processor is configured to: receive the image and identify a facial feature of the subject based on the image and the facial information maintained by the database; receive the image and identify a gesture of the subject based on the image and the skeletal information maintained by the database; and determine whether the subject is under duress based on at least one of the facial feature and the gesture. The access control system can further include an alarm device configured to output an alarm based on an indication of duress from the processor.

According to another implementation of the present disclosure, an access control system can include a camera configured to detect an image regarding a subject. The access control system can also include a database configured to store images and information corresponding to a plurality of subjects. The access control system can further include a processor in communication with the camera and the database, wherein the processor is configured to: detect a face in the image; and encode the image by degrading an encoding of the image at a region corresponding to the face.

According to another implementation of the present disclosure, an access control system can include a camera configured to detect an image regarding a subject. The access control system can also include a database configured to store images and information corresponding to a plurality of subjects, a corresponding location of each subject of the plurality of subjects, one or more messages associated with at least one of the plurality of subjects, and a corresponding message state associated with each subject, wherein each message state indicates whether or not one of the one or more messages is assigned to the corresponding subject. The access control system can further include a processor in communication with the camera and the database, wherein the processor is configured to: identify the subject based on the detected image; determine that the message state associated with the subject indicates a message of the one or more messages is assigned to the subject; and cause at least one of a mobile device associated with the subject or a notification device in a vicinity of the subject to output the message.

According to another implementation of the present disclosure, an access control system can include a camera configured to detect an image regarding a subject. The access control system can also include a processor in communication with the camera and configured to: identify the subject based on the image and identifies at least one additional subject based on the image; determine movement information regarding the subject and the at least one additional subject; and determine whether the at least one additional subject has permission to move through an access point based on the identified subject, the identified at least one additional subject, and the movement information.

According to another implementation of the present disclosure, an access control system can include a camera configured to detect an image regarding a subject. The access control system can also include a data communications device in communication with a mobile device associated with the subject. The access control system can further include a database configured to maintain facial information regarding a plurality of subjects. The access control system can also include a processor in communication with the camera, the data communications device, and the database, wherein the processor is configured to: execute an identification algorithm to identify the subject based on the detected image and the facial information maintained by the database; determine that the identification algorithm was not successful in identifying the subject; and perform one or more second factor authentication processes based on the identification algorithm being not successful.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

The present disclosure relates generally to the field of access control systems. More particularly, the present disclosure relates to facial recognition frictionless access control. As discussed herein, typical access control systems lack some abilities which can allow a person entrance into an unauthorized area of a building. For instance, additional security or verification is needed in some situations, such as where typical systems are unable to detect a user under duress, provide a second security verification, or provide notification of the presence of another person in certain areas of the building. Accordingly, the present disclosure describes access control systems for providing an increased level of security, compared to a typical access control system. In an aspect, the access control systems of the present disclosure can alert security or another user when an authorized user accessing an area of a building is under duress, when an unauthorized user is accessing an area of a building by tailgating after an authorized user, when an authorized user has not provided two-factor authentication, or when an authorized user is in a particular area of the building. Further, the present disclosure includes a frictionless system, which means a system that makes it as seamless as possible for a subject seeking access to provide the authentication needed to gain access. In other words, a frictionless system may include a system having no perceived delay or physical action required by the subject. For example, a frictionless system may allow a door, entryway, or gate to open before the subject reaches the door, entryway, or gate.

Turning now to the figures, example aspects are depicted with reference to one or more components described herein, where components in dashed lines may be optional.

Figure 1:
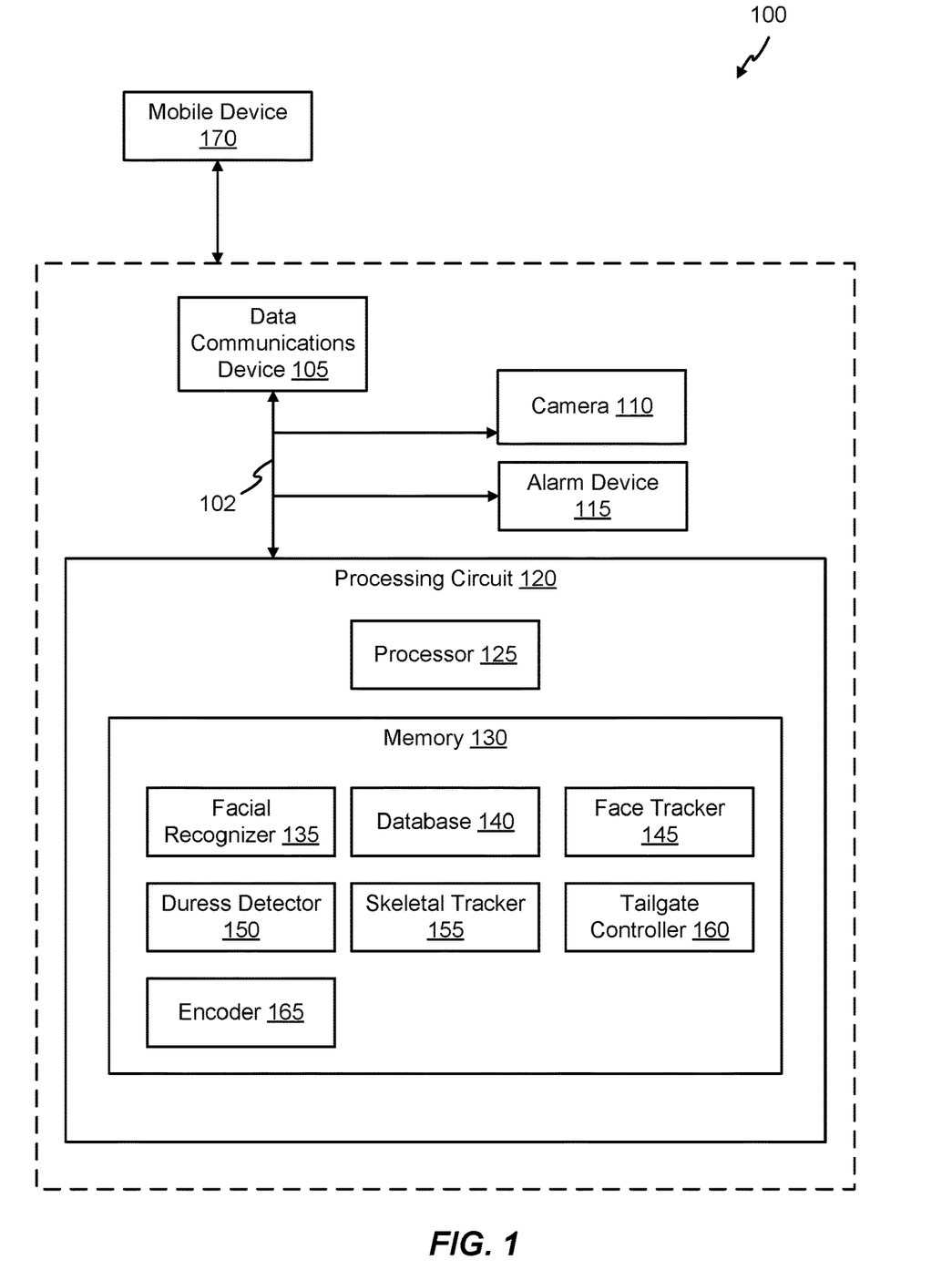
FIG. 1 is a block diagram of an access control system according to an aspect of the present disclosure.

Referring to FIG. 1, an access control system 100 is shown according to an aspect of the present disclosure. The access control system 100 can include a data communications device 105, a camera 110, an alarm device 115 (e.g., notification device), and a processing circuit 120 that are communicatively coupled to each other via a communication bus 102.

In an aspect, the camera 110 can be an image capture device that uses an image sensor to capture images. Examples of the camera 110 may include a still camera or a video camera. The alarm device 115 can include any device that outputs an alert (e.g., visual output, audio output) based on received information from the processing circuit 120.

The data communications device 105 may include wired or wireless interfaces (e.g., jacks, antennas, transmitters, receivers, transceivers, modems, wire terminals, etc.) for the access control system 100 to conduct data communications with various systems, devices, or networks. For example, the communications interface may include an Ethernet card and/or port for sending and receiving data via an Ethernet-based communications network. The communications interface may include a wireless transceiver (e.g., a WiFi transceiver, a Bluetooth transceiver, a NFC transceiver, ZigBee, etc.) for communicating via a wireless communications network. The communications interface may be configured to communicate via local area networks (e.g., a building LAN, etc.) and/or wide area networks (e.g., the Internet, a cellular network, a radio communication network, etc.) and may use a variety of communications protocols (e.g., BACnet, TCP/IP, point-to-point, etc.). The data communications device 105 can be used to communicate with a mobile device 170, which can execute an application for access control.

The processing circuit 120 can include a processor 125 and a memory 130. The processor 125 may be a general purpose or specific purpose processor, an application specific integrated circuit (ASIC), one or more field programmable gate arrays (FPGAs), a group of processing components, or other suitable processing components. The processor 125 may be configured to execute computer code or instructions stored in memory (e.g., fuzzy logic, etc.) or received from other computer readable media (e.g., CDROM, network storage, a remote server, etc.) to perform one or more of the processes described herein. The memory 130 may include one or more data storage devices (e.g., memory units, memory devices, computer-readable storage media, etc.) configured to store data, computer code, executable instructions, or other forms of computer-readable information for performing operations corresponding to access control described herein. The memory 130 may include random access memory (RAM), read-only memory (ROM), hard drive storage, temporary storage, non-volatile memory, flash memory, optical memory, or any other suitable memory for storing software objects and/or computer instructions. The memory 130 may include database components, object code components, script components, or any other type of information structure for supporting the various activities and information structures described in the present disclosure. The memory 130 may be communicably connected to the processor 125 via the processing circuit 120 and may include computer code for executing (e.g., by processor) one or more of the processes described herein.

The memory 130 can include various modules (e.g., circuits, engines) for completing processes described herein. For example, the memory 130 can include code or instructions for a facial recognizer 135, a database 140, a face tracker 145, a duress detector 150, a skeletal tracker 155, a tailgate controller 160, and an encoder 165.

Referring to FIGS. 2-6, methods of performing access control by the access control system 100 are described in conjunction with FIG. 1.

Detecting Duress Using Facial Recognition and Skeletal Tracking

In some aspects, the access control system 100 can perform actions based on receiving information from a subject (e.g., a person entering a building) indicating that the subject is accessing the building under duress. The access control system 100 can perform actions based on received information that does not provoke suspicion in anyone monitoring the subject's movements.

In an aspect, the access control system 100 can use the camera 110 to detect (or capture) images regarding a subject (e.g., as the subject approaches a door or other access point), the processor 125 executes the facial recognizer 135 that receives the images, the processor 125 executes the skeletal tracker 155 that receives the images, the database 140 maintaining facial information and skeletal information, and the alarm device 115.

The processor 125 executes the facial recognizer 135 to identify the subject based on the received images. In an example, the facial recognizer 135 can identify facial features based on the received images (e.g., expression, eye movements). The processor 125 executes the skeletal tracker 155 to identify movements of the subject based on the images (e.g., movements of the head or limbs).

The database 140 can include facial information and movement information regarding a plurality of subjects and registered gestures or facial expressions. The database 140 can also include duress information which includes registered data representative of duress of each subject. As such, the facial recognizer 135 and skeletal tracker 155 can compare the identified facial features and movements, respectively, compare the identified features and movements to the duress information, and output an indication of duress based on the comparisons.

The alarm device 115 can indicate that the subject is under duress based on receiving the indication of duress from the facial recognizer 135 and/or the skeletal tracker 155. In an example, the alert can include one or more of a visual, text, or audio alert to alert others of the duress. In some examples, the alarm device 115 can present a name of the subject under duress. In some examples, the alarm device can present a location of the subject under duress based on a location of the camera 110.

In some aspects, the facial recognizer 135 can detect a predetermined emotion or other physiological response, such as fear, based on the images. For example, the database 140 can include a fear threshold for each subject. The facial recognizer 135 can compute a fear value based on the received images, compare the fear value to the fear threshold for the particular subject (e.g., the subject identified from the images), and responsive to the fear value being greater than the fear threshold, the access control system 100 can provide access while causing the alarm device 115 to indicate an alert indicating that the subject may be entering the building under duress.

In an aspect, the facial recognizer 135 can monitor an eye state of the subject, such as eye movements, or eyes being open or closed. The facial recognizer 135 can monitor a number of times the subject blinks their eyes as they approach the camera 110 based on the received images. The database 140 can include a predetermined number of blinks over a period of time for each subject. In an example, one or more of the facial recognizer 135 or the duress detector 150 can compare the monitored number of blinks to the predetermined number of blinks, and responsive to the monitored number matching the predetermined number, the facial recognizer 135 can determine the subject to be under duress and cause the alarm device 115 to indicate the alert accordingly.

In an aspect, the skeletal tracker 155 can monitor movement of the subject based on the received images. The database 140 can include skeletal information including one or more gestures associated with each subject that can be used to indicate duress. The gestures may be subtle movements that the subject would not normally do when approaching the camera 110, such as touching their face, touching their shoulder, or moving their hand towards their pocket. In an example, one or more of the skeletal tracker 155 or the duress detector 150 can detect a gesture of the subject based on the received images, and based on the detected gesture matching the gestures of the database, determine the subject to be under duress and cause the alarm device 115 to indicate the alert accordingly.

Figure 2:
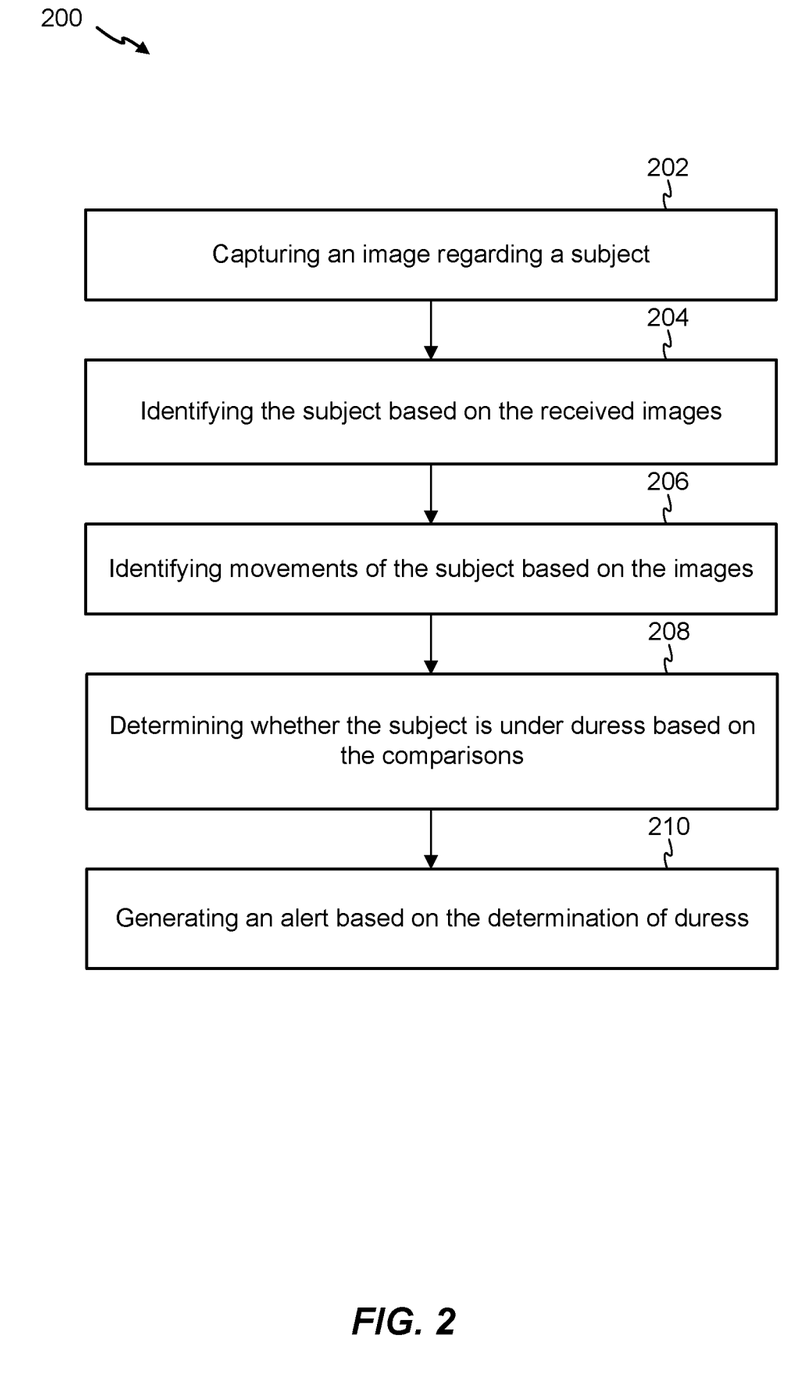
FIG. 2 is a flowchart of an example method for detecting duress using facial recognition and skeletal tracking according to an aspect of the present disclosure.

Referring to FIG. 2, an example of a method 200 for detecting duress using facial recognition and skeletal tracking is described herein.

At 202, the method 200 may include capturing an image regarding a subject. For example, the access control system 100 can use the camera 110 to detect (or capture) images regarding a subject (e.g., as the subject approaches a door or other access point). In an example, the subject may include any worker, user, or person attempting to gain access to a facility, building, etc.

At 204, the method 200 may include identifying the subject based on the received images. For example, the access control system 100 may use the processor 125 to execute the facial recognizer 135 to receive the images and to identify the subject based on the received images. In an example, the facial recognizer 135 can identify facial features based on the received images (e.g., expression, eye movements). In an example, the facial recognizer 135 may identify the subject by identifying facial features in the images and comparing the facial features to facial information stored in the database 140. Facial information can include information associated with facial features of one or more known subjects. Based on the comparison, the facial recognizer 135 may determine whether the facial features in the images match with any of the facial information of any of the known subjects. In an examples, the facial recognizer 135 may determine a match based on a percentage of facial features of the images that have the most matches with facial information of a subject.

At 206, the method 200 may include identifying movements of the subject based on the images. For example, the access control system 100 may use the processor 125 to execute the skeletal tracker 155 to identify movements of the subject based on the images (e.g., movements of the head or limbs). In an example, the skeletal tracker 155 may identify skeletal features in the images and compare the skeletal features with skeletal information stored in database 140. Based on the comparison, the skeletal tracker 155 may determine whether the skeletal information matches (e.g., based on a percentage of matching) the skeletal features of the images.

At 208, the method 200 may include determining whether the subject is under duress based on the comparisons. For example, the access control system 100 can use the processor 125 to execute the duress detector 150 to determine whether the subject is under duress based on the comparisons by one or more of the facial recognizer 135 and the skeletal tracker 155. In an example, the duress detector 150 can determine duress based one or more facial features and/or skeletal features/movements indicating duress. For example, when performing the comparison, the duress detector 150 may compare the facial features and the skeletal features (e.g., gestures—hand movements or signs, facial expressions) of the images to the facial information and skeletal information stored in the database 140 which can include facial information regarding a plurality of subjects and registered gestures or facial expressions, including registered data representative of duress of each subject and/or known general gestures or general facial features/expressions indicative of duress. As such, the facial recognizer and skeletal tracker can compare the identified facial features and movements, respectively, compare the identified features and movements to the registered data, and output an indication of duress based on the comparisons.

At 210, the method 200 may include generating an alert based on the determination of duress. For example, the access control system 100 may use the alarm device 115 to indicate that the subject is under duress based on receiving the indication of duress from the facial recognizer 135 and/or the skeletal tracker 155. In an example, the alert can include one or more of a visual, text, or audio alert to alert others of the duress. In some examples, the alarm device 115 can present a name of the subject under duress. In some examples, the alarm device can present a location of the subject under duress based on a location of the camera 110.

Face Redaction Using Facial Recognition and Region of Interest Encoding

Facial recognition systems can be improved by redacting facial information from live video; however, this process can be computationally intensive. The present solution addresses these challenges by using a CCTV video camera to redact faces in real time with reduced computational requirements.

The access control system 100 can include the camera 110 that captures images, the facial recognizer 135 that can detect faces in an image, and the encoder 165 that provides region of interest configuration. Region of interest configuration for an encoder changes the configuration parameters for the encoder 165 so that an encoded frame has different image quality settings for user configurable regions within a frame. In a typical system, this feature is used to enhance the image quality for faces when face detection and recognition are running. However, in the present disclosure, this features is used to degrade image quality of faces.

The camera 110 can capture an image, which is provided to the facial recognizer 135, and also to the encoder 165 to encode the image (e.g., encode video of a stream of images). Facial detection can be executed on the captured image to detect one or more areas (relating to regions of interest in the image which may include one or more detected faces) corresponding to detected faces. The facial recognizer 135 provides the detected one or more areas to the encoder 165 to be configured as one or more regions of interest. When the image is provided to the encoder 165 for encoding, rather than enhancing the image quality in the regions of interest, the encoder 165 will degrade the encoding algorithm in the regions of interest (corresponding to the one or more areas received from the facial detection component) to redact the faces.

Figure 3:
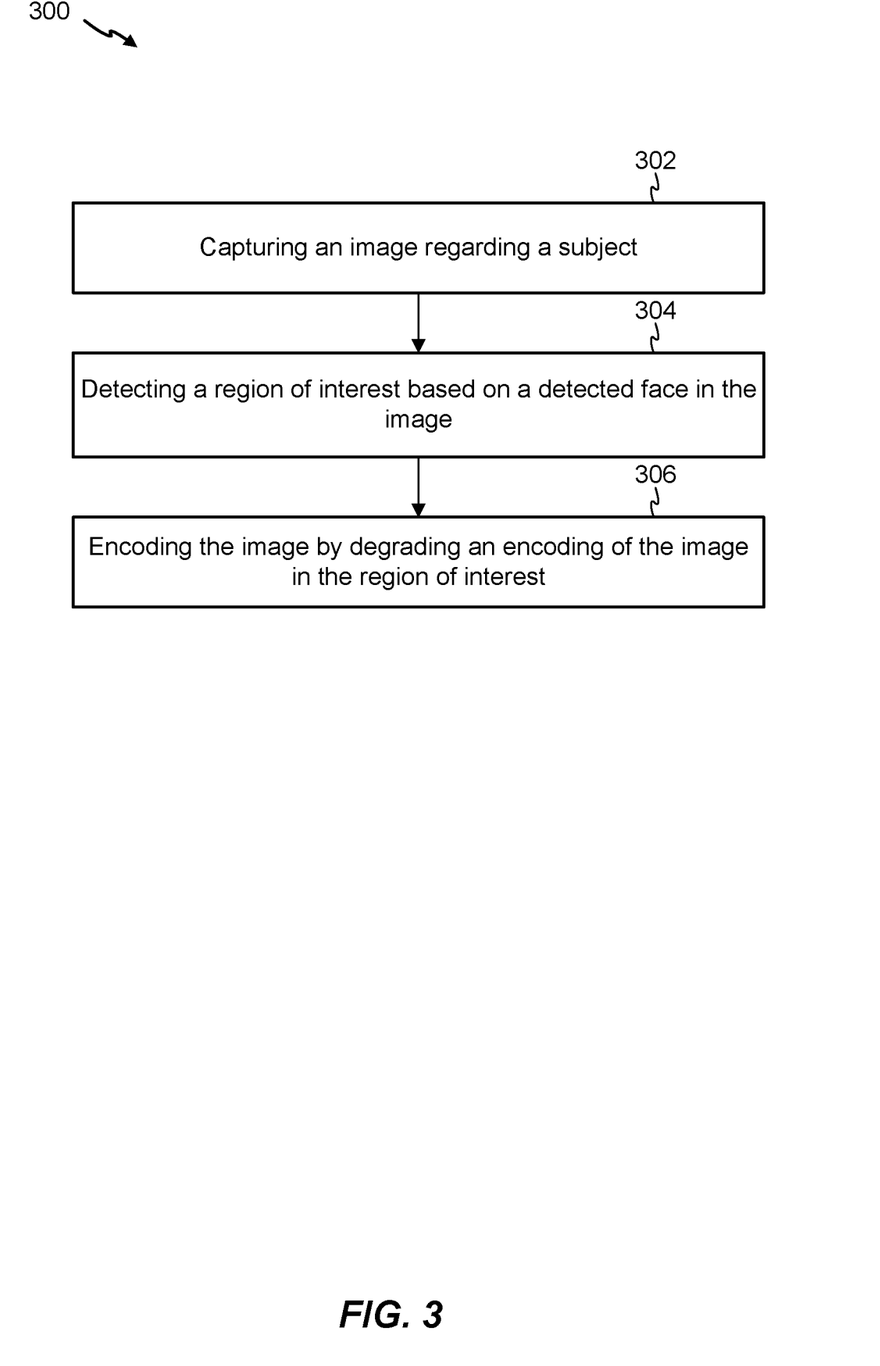
FIG. 3 is a flowchart of an example method for face redaction using facial recognition and region of interest encoding according to an aspect of the present disclosure.

Referring to FIG. 3, an example of a method 300 for face redaction using facial recognition and region of interest encoding is described herein.

At 302, the method 300 may include capturing an image regarding a subject. For example, the access control system 100 can include the camera 110 to capture images regarding a subject.

At 304, the method 300 may include detecting a region of interest in the image based on a detected face in the image.

For example, the access control system 100 can include the processor 125 to execute the facial recognizer 135 to detect faces in the image from the camera 110. In an example, the facial recognizer 135 may identify the subject by identifying facial features in the images and comparing the facial features to facial information stored in the database 140. The facial recognizer 135 may detect the region of interest based on the facial features corresponding to facial information stored in the database 140.

At 306, the method can include encoding the image by degrading an encoding of the image in the region of interest. For example, the access control system 100 can include the processor 125 to execute the encoder 165 to encode the image. In an example, the encoder 165 receives an indication of the region of interest from the facial recognizer 135. The encoder 165 can change parameters for the region of interest so that an encoded frame has a lower image quality from other portions of the image.

Intelligent Subject Detection

Facial recognition systems can be used to generate a real-time database of locations of subjects (e.g., people) within a building, such as to enable notification to a subject that they are required to be at a specific location.

In an aspect, the access control system 100 can include a camera 110 and alarm device 115, including a plurality of audio speakers located at access points throughout a building; the facial recognizer 135 to identify subjects as they pass access points throughout the building; the processor 125 (e.g., a server) that uses subject identification information (e.g., locations of subjects based on facial recognition) to generate the real-time database of locations; the data communications device 105 (e.g., a notification system) that can send notifications to the mobile device 170; and a user interface application executing on the mobile device 17) in communication with the access control system 100 to locate subjects and provide alert messages to subjects.

In some aspects, the access control system 100 can be used when a first subject would like a second subject to be in a specific location, such as to attend a meeting. A user interface application of the mobile device 170 (e.g., operated by the first subject) can receive a user input indicating instructions to cause an alert message to be outputted when the second subject is identified at an access point. The second subject moves through building as normal; when the access control system 100 identifies the second subject at a particular access point, the access control system outputs the associated alert message (e.g., an audio message, such as an audio message "Please attend the meeting in Room 1" or "Please go to reception, there is a visitor waiting for you") to one or more of the alarm device 115 or the mobile device 170.

In some aspects, the access control system 100 can be used to generate the real-time database of locations of subjects (e.g., person mapping configuration). The access control system 100 can identify subjects using the facial recognizer 135 (e.g., when subjects are in the vicinity of cameras 110 of the access control system 100). In some aspects, such as if the first subject would like to contact the second subject, the user interface application of the mobile device 170 can receive a user input indicating instructions to present the location of the second subject; the user interface application of the mobile device 170 may also receive instructions to cause the access control system 100 to output a notification and/or an alert message, such as but not limited to an audio message, to the second subject to go to a particular location (e.g., the location of the first subject, which may correspond to the location of the mobile device 170 associated with the user interface application which received the user input from the first subject).

Figure 4:
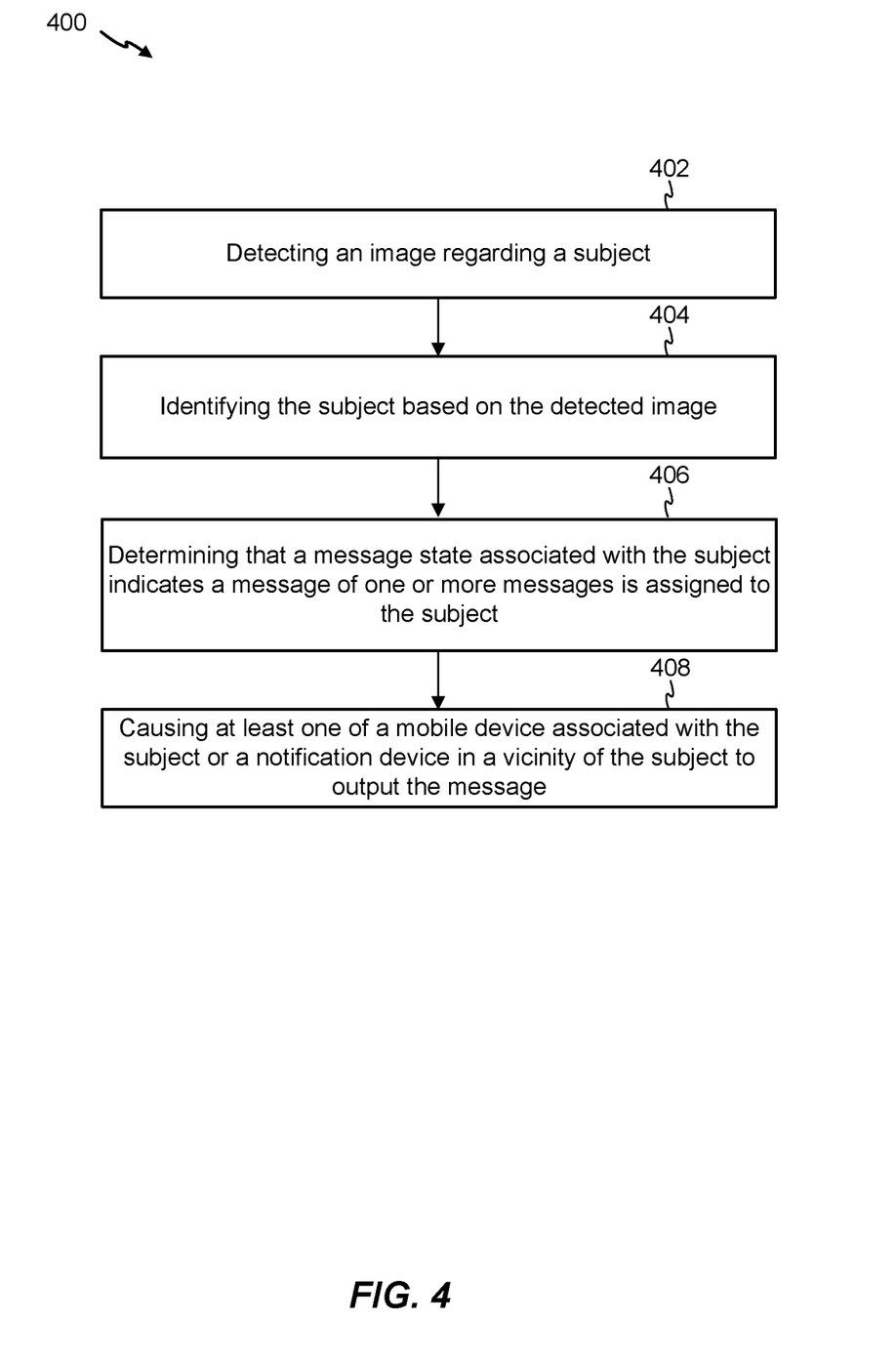
FIG. 4 is a flowchart of an example method for intelligent subject detection according to an aspect of the present disclosure.

Referring to FIG. 4, an example of a method 400 for intelligent subject detection is described herein.

At 402, the method 400 can include detecting an image regarding a subject. For example, the access control system 100 can include a plurality of cameras 110 to detect an image regarding a subject.

At 404, the method 400 may include identifying a subject based on the detected image. For example, the access control system 100 can include the processor 125 to execute the facial recognizer 135 to detect faces in the image from the camera 110. In an example, the facial recognizer 135 may identify the subject by identifying facial features in the images and comparing the facial features to facial information stored in the database 140.

At 406, the method 400 can include determining that a message state associated with the subject indicates a message of one or more messages is assigned to the subject. For example, the processor 125 can determine that the message state stored in the database 140 indicates a message of one or more messages stored in the database 140 is assigned to the subject.

At 408, the method 400 can include causing at least one of a mobile device associated with the subject or a notification device in a vicinity of the subject to output the message. For example, the processor 125 may transmit (e.g., via communications device 105 or bus 102) instructions to one or more of the alarm device 115 or the mobile device 170 to output the message.

In some examples, the method 400 may optionally include receiving a first user input indicating instructions to present the corresponding location of the subject; and receiving a second user input, subsequent to the first user input, including the message, wherein the message includes information indicating that the subject is required to be at a specific location different from the corresponding location of the subject.

Intelligent Tailgating Detection

One of the issues encountered with typical access control systems is the problem of tailgating. Tailgating occurs when a first person with valid access to an area is closely followed by a second person who is not allowed access. When the first person is granted access, the second person also gains illegal access to the area by following the first person closely before a door or gate closes shut.

There are also cases where tailgating is allowed. A typical scenario would be where an employee is chaperoning a number of visitors around a building. In this case, it may be valid that the visitors are allowed access to the building as long as they are accompanied by the employee.

At least one solution can address such concerns by using facial recognition and other feature detection methods to determine whether tailgating that is occurring should be permitted. In some aspects, the access control system 100 includes the camera 110 to record video images of people approaching an access point; the alarm device including a speaker system co-located with the camera 110 to allow audio announcements and outputs an indication of a tailgating event having occurred; the facial recognizer 135 that uses video images from the camera and stored images on the database 140 to grant access to an area; a face tracking system (e.g., facial recognizer 135 and/or face tracker 145) that uses face detection and facial recognition to analyze images from the video camera and track the direction of travel of faces through a video image (e.g., to monitor for tailgating); the database 140 maintaining face recognition information; and the tailgate controller 160.

The database 140 can maintain, for each subject, a scheduler indicative of whether to allow the subject to be granted or denied access to an area at particular times during the day. Each scheduler entry can include a counter that identifies a number of additional subjects that will be allowed to tailgate the person when they enter the corresponding area. This can be set to zero by default. The database 140 can maintain facial features representative of each subject to facilitate facial recognition. In some aspects, the database 140 maintain facial features (e.g., face entries) for persons of interest, that is, people who should be denied access under particular circumstances or all circumstances.

The tailgate controller 160 can output announcements for when tailgating is detected. The tailgate controller 160 can execute configurable actions for when tailgating is detected. For example, the tailgate controller 160 can cause the access control system 100 to deny access to everyone; the tailgate controller 160 can cause the access control system 100 to allow access and output an alarm via the alarm device 115.

Tailgating Detection

The access control system 100 can process images from the camera 110 to generate a data structure maintaining location and direction of movement of all faces (e.g., all subjects associated with respective faces) in the received images. The data structure may be maintained in the database 140. The facial recognizer 135 and/or the face tracker 145 can execute facial recognition to identify each subject, and determine whether to allow access to the identified subject based on the facial recognition. In some aspects, tailgating detection includes determining one or more of a location, a direction, or a speed of travel for each face in a field of view (e.g., each face associated with subjects additional to a first identified subject). The facial recognizer 135 and/or the face tracker 145 can determine which subjects(s) corresponding to the identified faces are allowed access through the corresponding access point. If the facial recognizer 135 and/or the face tracker 145 determines that each subject is allowed access, the facial recognizer 135 and/or the face tracker 145 grants access as there is no risk of tailgating. If the facial recognizer 135 and/or the face tracker 145 determines that at least one tracked face is not identified to correspond to a known subject (e.g. maintained in the database 140) or a subject that is not allowed access, the face tracker 145 can use the location, direction, and/or speed information to determine whether such subjects will be able to enter the access point at the same time as the subject that is allowed access. As such, the face tracker 145 can determine whether there is a risk of tailgating.

Responsive to determining that there is no risk or likelihood of tailgating, the tailgate controller 160 can allow access to the first subject. Responsive to determining that there is a risk or likelihood of tailgating, the tailgate controller 160 can retrieve information from the database 140 regarding whether the first subject is expected to be with other subjects (e.g., in a schedule associated with the subject). For example, the database 140 can maintain information regarding whether the first subject is expected to be accessing the particular access point at the particular time period, and whether the first subject will be accompanied by one or more unknown subjects; if the schedule does indicate that these conditions are met, then the system can allow access to the first subject. Similarly, responsive to determining that these conditions are not met (e.g., the first subject is not expected to be accessing the particular access point at the particular time period or is not expected to be accompanied) the tailgate controller 160 can determine tailgating to have occurred.

Tailgating Notification

Responsive to determining tailgating to have occurred, the tailgate controller 160 can execute various actions. The tailgate controller 160 can deny access to the first subject. The tailgate controller 160 can cause the alarm device 115 to output an indication of the tailgating, such as an audio announcement or other alarm. The audio announcement may indicate that subjects not allowed to access should move further from the access point; it will be appreciated that the facial recognizer 135, the face tracker 145, and/or the tailgate controller 160 can periodically process the received images to determine whether tailgating is occurring, such that if subjects determined to be tailgating in a first image have moved further from the access point by the time a second, subsequent image is analyzed, the tailgate controller 160 can determine based on the second image that tailgating is not occurring and deactivate the alarm or otherwise discontinue actions that would take place based on tailgating. In some aspects, the alarm device 115 can output an alert signal indicating there is a risk of tailgating. In some aspects, the tailgate controller 160 can allow access to the first subject and each of the addition subjects, and the alarm device 115 can output an alarm. Outputting an alarm can include outputting an audio alert to indicate that tailgating has been detected.

Subjects of Interest

The access control system 100 can maintain subject of interest information. Responsive to detecting a subject of interest in the received images, the access control system 100 can output an alarm indicating the name and/or location of the subject of interest; output an audible alarm on the speaker adjacent to the camera 110; and/or deny access to each subject until the person of interest leaves the scene (e.g., is no longer detected in the received images).

Figure 5:
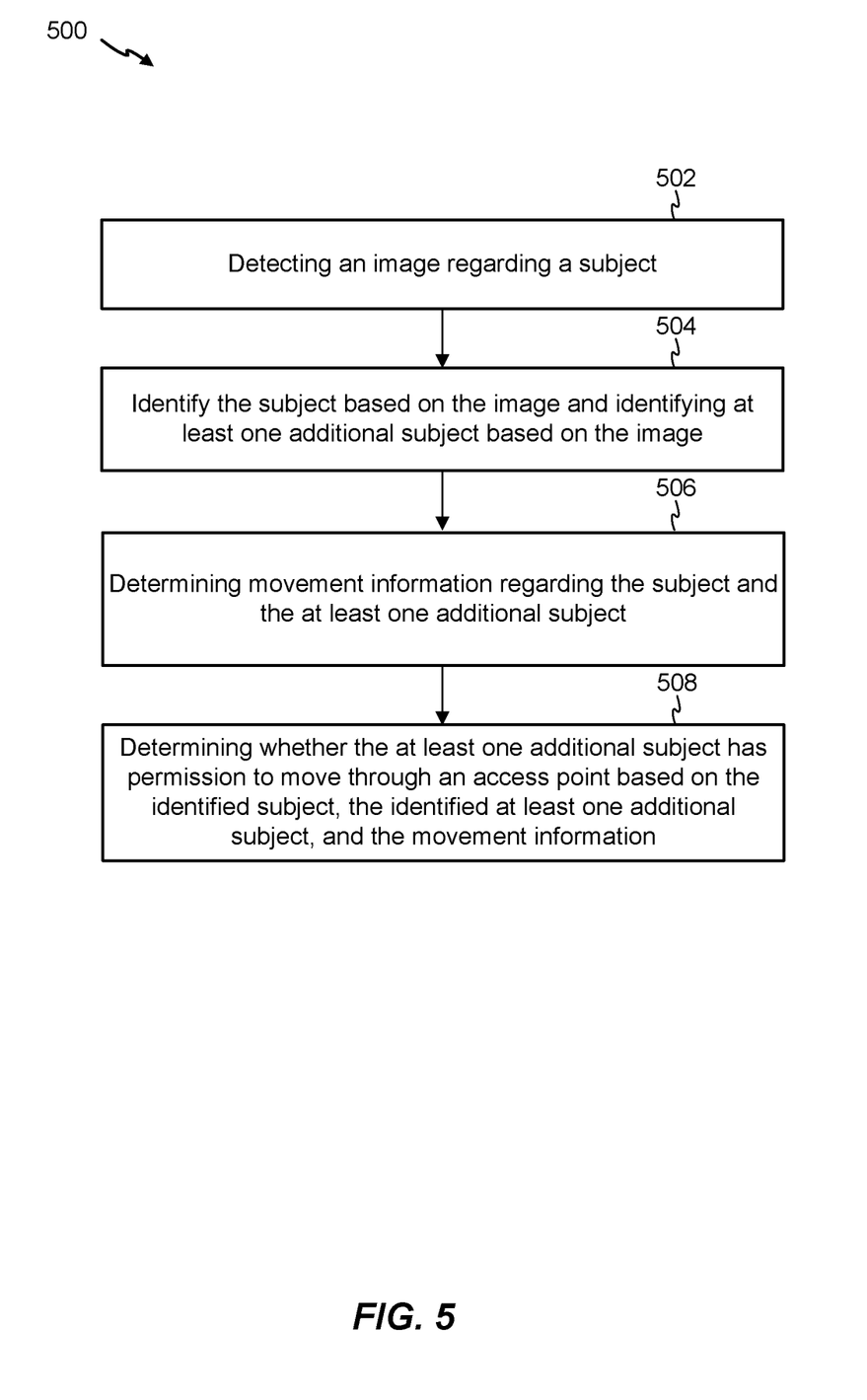
FIG. 5 is a flowchart of an example method for managing intelligent tailgating according to an aspect of the present disclosure.

Referring to FIG. 5, an example of a method 500 for managing intelligent tailgating is described herein.

At 502, the method 500 can include detecting an image regarding a subject. For example, the access control system 100 can include the camera 110 to capture images regarding a subject.

At 504, the method 500 may include identify the subject based on the image and identifying at least one additional subject based on the image. For example, the access control system 100 can include the processor 125 to execute the facial recognizer 135 to detect faces in the image from the camera 110. In an example, the facial recognizer 135 may identify the subject by identifying facial features in the images and comparing the facial features to facial information stored in the database 140.

At 506, the method 500 can include determining movement information regarding the subject and the at least one additional subject. For example, the processor 125 may execute the face tracker 145 to determine one or more of a location, a direction, or a speed of travel for each face corresponding to the plurality of subjects identified by the facial recognizer 135. In an example, the face tracker 145 may monitor movements of each of the faces based on the images and calculate movements based on changes to locations of the face between images.

At 508, the method 500 can include determining whether the at least one additional subject has permission to move through an access point based on the identified subject, the identified at least one additional subject, and the movement information. For example, the processor 125 may execute the face tracker 145 to determine that at least one tracked face is not identified to correspond to a known subject (e.g. maintained in the database 140) or a subject that is not allowed access, the face tracker 145 can determine and use the location, direction, and/or speed information to determine whether such subjects will be able to enter the access point at the same time as the subject that is allowed access. As such, the face tracker 145 can determine whether there is a risk of tailgating.

In some aspects, the method 500 can optionally include providing access to the one or more subjects based on the determination. For example, the processor 125 may execute the tailgate controller 160 to provide access to one or more of the subjects. In an example, responsive to determining that there is no risk or likelihood of tailgating, the tailgate controller 160 can allow access to the first subject. Responsive to determining that there is a risk or likelihood of tailgating, the tailgate controller 160 can retrieve information from the database 140 regarding whether the first subject is expected to be with other subjects (e.g., in a schedule associated with the subject).

The method 500 may also optionally include alerting others about the tailgating. For example, the alarm device 115 may alert others of the tailgating based on a signal from one or more of the facial recognizer 135 or the face tracker 145.

Second Factor Authentication Using Mobile Devices

Access control systems may not always identify a subject, even if features regarding the subject are maintained in a database. Although facial recognition systems can be highly accurate, there can be a chance (however small) that the system may fail to identify a known subject. This may be due to an unclear image captured by the face recognition system or some subtle changes to the subject's appearance (e.g. hairstyle) or due to the subject wearing a covering over their face (face obscuration). The present solution can use a mobile device to provide second (e.g., backup) information to identify and/or authenticate the subject.

The access control system 100 can include the camera 110 that captures images for the purposes of person identification; the data communications device 105 (e.g., a WiFi and/or Bluetooth transceiver); the facial recognizer 135 that identifies subjects using the captured images; and the database 140 including features regarding subjects such as images of each subject's face, as well as information regarding the mobile device 170 corresponding to each subject, such as an identifier of the mobile device 170. In some aspects, the mobile device 170 executes an application that can communicate with the access control system 100.

Responsive to not identifying a subject in the received images, the access control system 100 can execute various actions as backup face recognition, including using codes, mobile device-based facial recognition, and/or mobile device information.

Codes

The access control system 100 can generate a code, such as an image-based code (e.g., a QR code). The code may be a single use code (e.g., the code is newly generated for each authentication). The access control system 100 can transmit the code to the application executed by the mobile device 170, such that the application presents the code for display on the mobile device 170. The access control system 100 can receive an image from the camera 110 that includes the code (e.g., if the subject positions the code in the field of view of the camera). Responsive to the code identified in the image matching the transmitted code, the access control system 100 can allow access.

The access control system 100 can transmit instructions to the application on the mobile device 170 to cause the application to execute a facial recognition process. The application can receive results of the facial recognition process, and transmit the results to the access control system 100. The access control system 100 can also receive a location where the facial recognition was performed (e.g., GPS data) and/or the image(s) captured by the mobile device 170 based on which the mobile device 170 executed facial recognition. The access control system 100 can compare the location to a known location of the access point to verify that the locations match, and can similarly compare details in a background of the image(s) captured by the mobile device 170 to known features of the environment around the access point to determine whether the locations match. Responsive to one or both matches being detected, the access control system 100 can grant access.

Mobile Device Information

Responsive to not detecting the person using facial recognition, the access control system 100 can request, from the mobile device 170, mobile device identification information, such as a media access control (MAC) address or wireless identifier (e.g., Bluetooth identifier). The access control system 100 can receive the mobile device identification information and compare this information to information maintained in the database 140, and responsive to determining a match, the access control system 100 can allow access.

Figure 6:
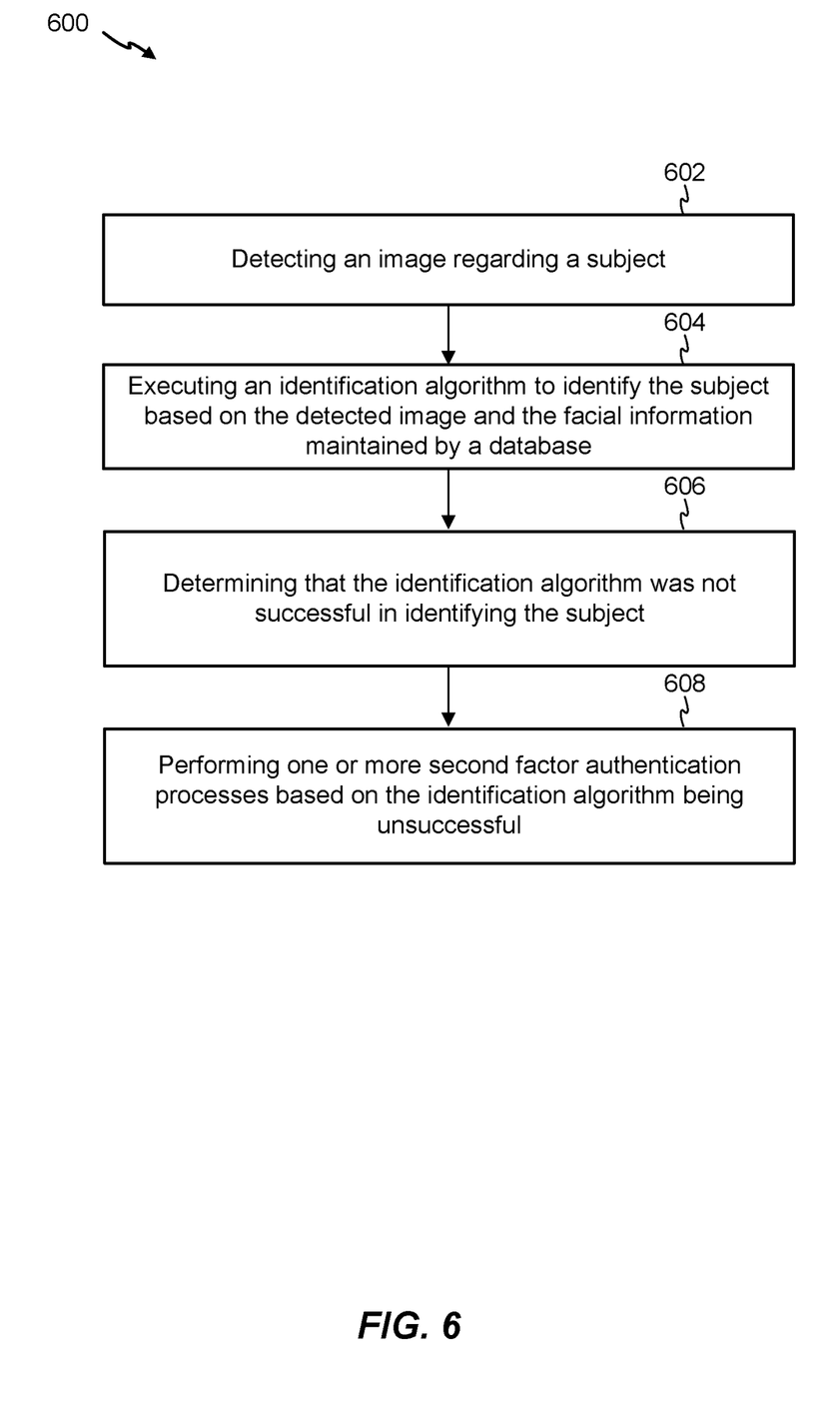
FIG. 6 is a flowchart of an example method for second factor authentication in an access control system according to an aspect of the present disclosure.

Referring to FIG. 6, an example of a method 600 for second factor authentication in an access control system is described herein.

At 602, the method 600 can include detecting an image regarding a subject. For example, the access control system 100 can include the camera 110 to detect an image regarding a subject.

At 604, the method 600 may include executing an identification algorithm to identify the subject based on the detected image and the facial information maintained by a database. For example, the access control system 100 can include the processor 125 to execute the facial recognizer 135 to detect a face in the image from the camera 110. In an example, the facial recognizer 135 may identify the subject by identifying facial features in the image and comparing the facial features to facial information stored in the database 140.

At 606, the method 600 may include determining that the identification algorithm was not successful in identifying the subject. For example, the processor 125 may execute the facial recognizer 135 to determine that the identification algorithm was not successful in identifying the subject based on facial features of the image not matching facial information stored by the database 140.

At 608, the method 600 may include performing one or more second factor authentication processes based on the identification algorithm being unsuccessful. In an example, the processor 125 and/or the data communications device 105 can perform the second factor authentication process. In some examples, the second factor authentication process can include outputting a code to the mobile device 170 such that the code can be presented to the camera 110 for matching to the outputted code and granting access via an access point. In some examples, the second factor authentication process can include comparing a location of the mobile device 170 to a location of the access point to grant access via the access point. In some examples, the second factor authentication process can include receiving an identifier from the mobile device 170 and determining whether to grant access via the access point based on the identifier.

The construction and arrangement of the systems and methods as shown in the various exemplary aspects are illustrative only. Although only a few aspects have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative aspects. Other substitutions, modifications, changes, and omissions can be made in the design, operating conditions and arrangement of the exemplary aspects without departing from the scope of the present disclosure.

The present disclosure contemplates methods, systems and program products on any machine-readable media for accomplishing various operations. The aspects of the present disclosure can be implemented using existing computer processors, or by a special purpose computer processor for an appropriate system, incorporated for this or another purpose, or by a hardwired system. Aspects within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

What is claimed is:

1. An access control system, comprising:
  a camera configured to record an image of two or more subjects approaching an access point; and
  a processor in communication with the camera and configured to:
    identify a subject based on the image;
    identify at least one additional subject based on the image;
    determine movement information regarding the subject and the at least one additional subject;

determine a likelihood of risk of tailgating by the at least one additional subject based on information specifying whether the subject is expected to be accessing an access point at a particular time period, and whether the subject will be accompanied by one or more unknown subjects;

determine whether the at least one additional subject has permission to move through the access point based on the subject, the at least one additional subject, the movement information, and the likelihood of risk of tailgating; and permit or deny access movement of the subject or the at least one additional subject through the access point based on whether the at least one additional subject has permission.

2. The access control system of claim 1, further comprising:
a database configured to store a scheduler corresponding to the subject, wherein the scheduler includes scheduling information indicating a time the subject has permission to move through the access point,
wherein the processor is further configured to determine whether the at least one additional subject has permission to move through the access point further based on the scheduler.

3. The access control system of claim 2, wherein the scheduler further includes a counter identifying a number of additional subjects having permission to move through the access point with the subject,
wherein the processor is further configured to determine whether the at least one additional subject has permission to move through the access point further based on the counter.

4. The access control system of claim 1, wherein to determine the movement information, the processor is further configured to determine the movement information regarding the subject and the at least one additional subject based on one or more of a location, a direction, or speed information of at least one of the subject or the at least one additional subject.

5. The access control system of claim 1, further comprising:
an alarm device configured to output an indication of a tailgating event based on the at least one additional subject not having permission.

6. The access control system of claim 1, wherein the processor is further configured to:
determine the subject has permission to move through the access point; and
deny movement by the subject through the access point based on whether the at least one additional subject has permission.

7. A method comprising:
receiving, from a camera, an image of two or more subjects approaching an access point;
identifying a subject based on the image;
identifying at least one additional subject based on the image;
determining movement information regarding the subject and the at least one additional subject;
determining a likelihood of risk of tailgating by the at least one additional subject based on information specifying whether the subject is expected to be accessing an access point at a particular time period, and whether the subject will be accompanied by one or more unknown subjects;

determining whether the at least one additional subject has permission to move through an access point based on the subject, the at least one additional subject, the movement information, and the likelihood of risk of tailgating; and permitting or denying access movement of the subject or the at least one additional subject through the access point based on whether the at least one additional subject has permission.

8. The method of claim 7, further comprising:
storing scheduling information indicating a time the subject has permission to move through the access point; and
determining whether the at least one additional subject has permission to move through the access point further based on the scheduling information.

9. The method of claim 8, wherein the scheduling information includes a counter identifying a number of additional subjects having permission to move through the access point with the subject, and further comprising:
determining whether the at least one additional subject has permission to move through the access point further based on the counter.

10. The method of claim 7, further comprising:
determining movement information regarding the subject and the at least one additional subject based on one or more of a location, a direction, or speed information of at least one of the subject or the at least one additional subject.

11. The method of claim 7, further comprising:
outputting, via an alarm device, an indication of a tailgating event based on the at least one additional subject not having permission.

12. A non-transitory computer-readable device having instructions thereon that, when executed by at least one computing device, causes the at least one computing device to perform operations comprising:
receiving, from a camera, an image of two or more subjects approaching an access point;
identifying a subject based on the image;
identifying at least one additional subject based on the image;
determining movement information regarding the subject and the at least one additional subject;
determining a likelihood of risk of tailgating by the at least one additional subject based on information specifying whether the subject is expected to be accessing an access point at a particular time period, and whether the subject will be accompanied by one or more unknown subjects;
determining whether the at least one additional subject has permission to move through the access point based on the subject, the at least one additional subject, the movement information, and the likelihood of risk of tailgating; and
outputting, via an alarm device, an indication of a tailgating event based on the at least one additional subject not having permission.

13. The non-transitory computer-readable device of claim 12, wherein the operations further comprise:
storing scheduling information indicating a time the subject has permission to move through the access point; and
determining whether the at least one additional subject has permission to move through the access point further based on the scheduling information.

14. The non-transitory computer-readable device of claim 13, wherein the scheduling information includes a counter identifying a number of additional subjects having permission to move through the access point with the subject, and the operations further comprising:
  determining whether the at least one additional subject has permission to move through the access point further based on the counter.

15. The non-transitory computer-readable device of claim 12, wherein the operations further comprise: determining movement information regarding the subject and the at least one additional subject based on one or more of a location, a direction, or speed information of at least one of the subject or the at least one additional subject.

16. The non-transitory computer-readable device of claim 12, wherein the operations further comprise:
  permitting or denying access movement of the subject or the at least one additional subject through the access point based on whether the at least one additional subject has permission.

17. The non-transitory computer-readable device of claim 12, wherein the operations further comprise:
  determining the subject has permission to move through the access point; and
  denying movement by the subject through the access point based on whether the at least one additional subject has permission.

* * * * *